Aug. 26, 1958     G. WESTENRIEDER     2,849,042
FOOD SLICER AND DICER
Filed July 26, 1956     3 Sheets-Sheet 1
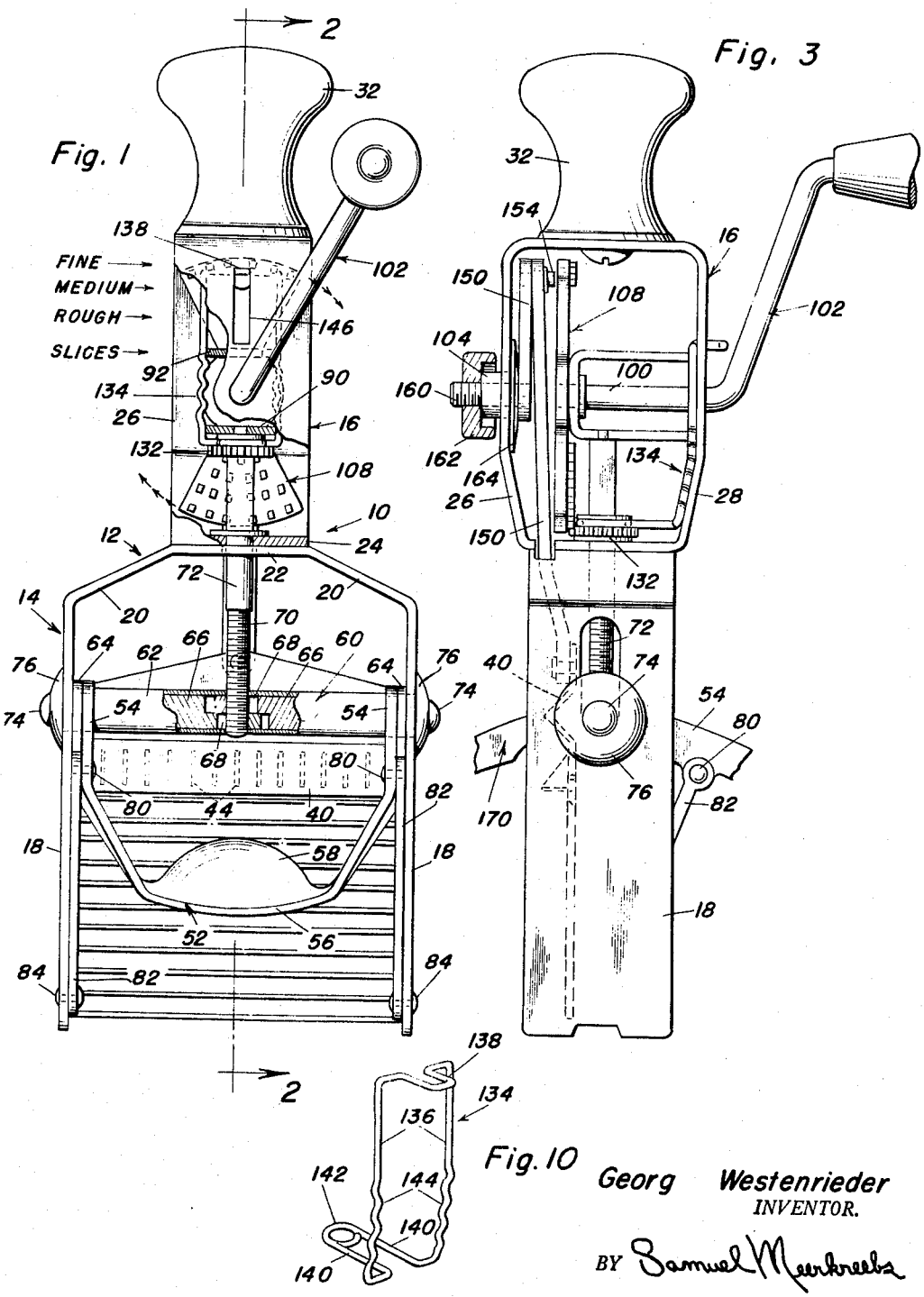
Georg Westenrieder
INVENTOR.
BY Samuel Meerkreebs Aug. 26, 1958
G. WESTENRIEDER
2,849,042
FOOD SLICER AND DICER
Filed July 26, 1956
3 Sheets-Sheet 2
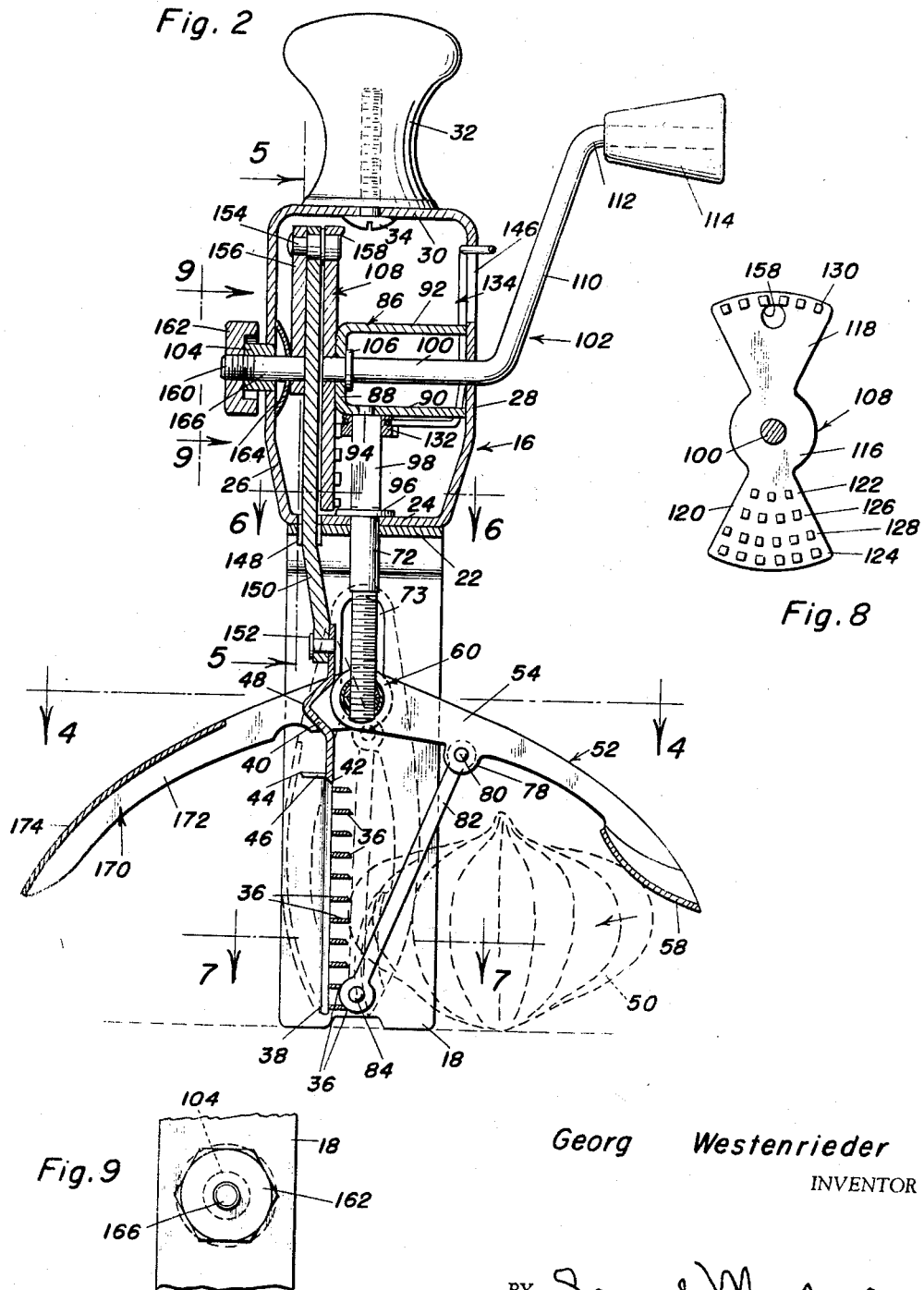
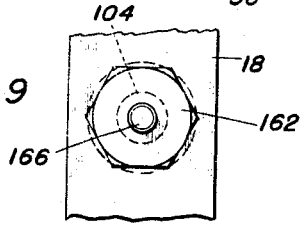
Georg Westenrieder
INVENTOR
BY [signature]
ATTORNEY Aug. 26, 1958     G. WESTENRIEDER     2,849,042
FOOD SLICER AND DICER
Filed July 26, 1956     3 Sheets-Sheet 3
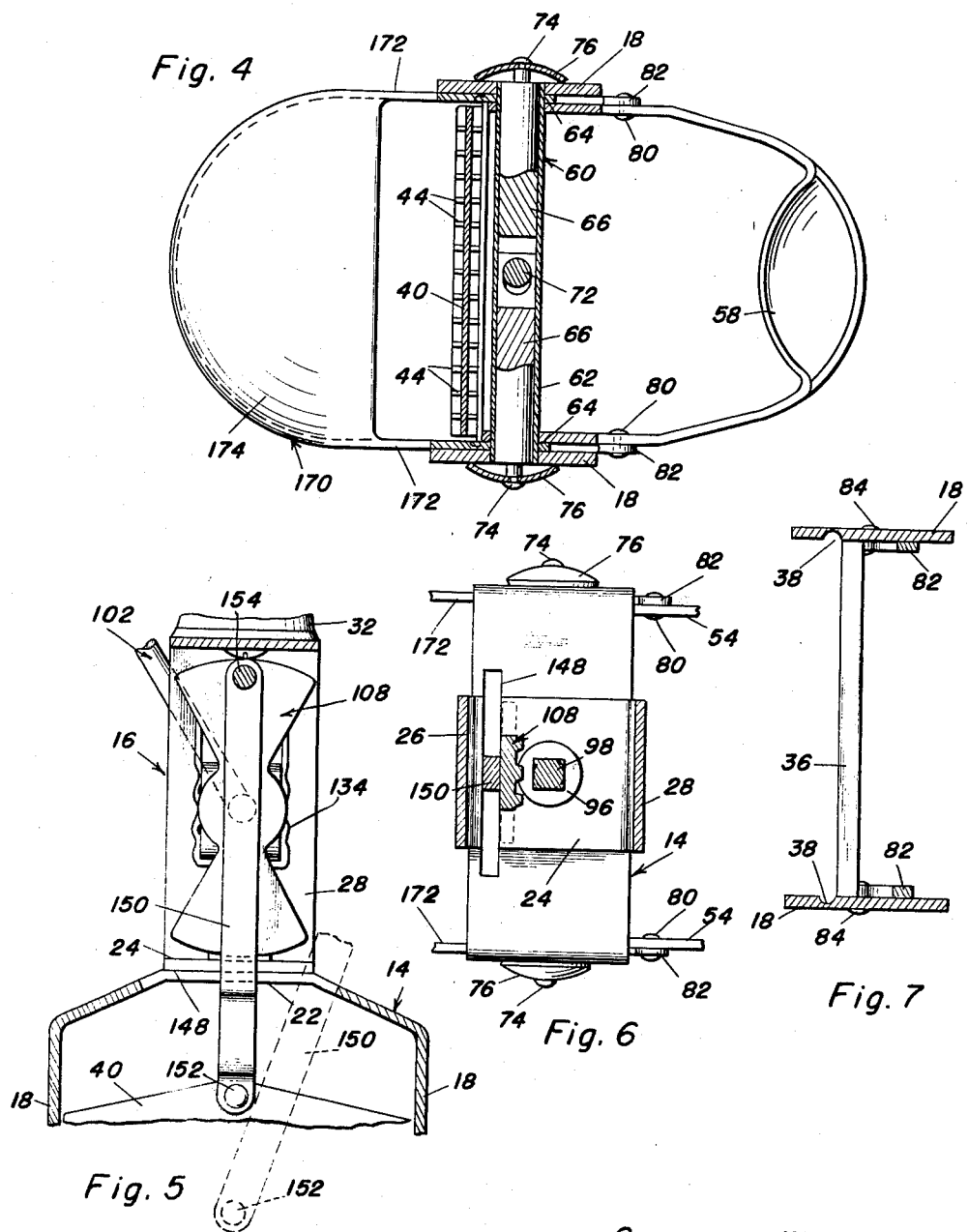
Georg Westenrieder
INVENTOR.
BY Samuel Meerkreebs

United States Patent Office 2,849,042
Patented Aug. 26, 1958

2,849,042

FOOD SLICER AND DICER

Georg Westenrieder, Montreal, Quebec, Canada

Application July 26, 1956, Serial No. 600,241

7 Claims. (Cl. 146—78)

This invention relates in general to new and useful improvements in kitchen utensils, and more specifically to an improved food slicer and dicer.

A primary object of this invention is to provide an improved kitchen utensil which may be utilized selectively for either slicing articles of food, such as potatoes, onions and the like, or for dicing the same foods.

Another object of this invention is to provide an improved food dicer, the food dicer including a first set of fixed blades or knives and a movable knife mounted for reciprocation in a plane normal to the fixed knives whereby as food is moved through the fixed knives and cut into slices, the movable knife cuts off the slices at intervals to cut the food into long strips.

Still another object of this invention is to provide an improved kitchen utensil for cutting articles of food, such as potatoes, into elongated strips, the kitchen utensil including a first set of fixed knives and a movable knife mounted for reciprocation normal to the fixed knives, there being provided suitable drive means for progressively forcing the article of food to be cut through the fixed knives and for reciprocating the movable knife at a varying ratio with respect to the progress of the food through the fixed knives whereby strips of various widths may be selectively cut.

A further object of this invention is to provide an improved kitchen utensil for slicing foods, the kitchen utensil including a series of fixed knives, means for pushing an article of food through the fixed knives for cutting the article of food into slices, and a movable blade or knife for cutting the slices into elongated strips, the movable knife being selectively disconnected whereby either slices or strips may be cut with the kitchen utensil.

Still a further object of this invention is to provide a novel drive means for a kitchen utensil whereby the ratio of driving of various of the components of the kitchen utensil may be selectively varied with a minimum of effort and expenditure of time on the part of the operator.

These together with other objects and advantages which will become apparent reside in the details of construction and operation as more fully hereinafter described and claimed, reference being had to the accompanying drawing forming a part hereof, wherein like numerals refer to like parts throughout and in which:

Figure 1 is a side elevational view of the food slicer which is the subject of this invention and shows the general details thereof, portions of the food slicer being broken away and shown in section for purposes of clarity;

Figure 2 is a vertical sectional view taken substantially upon the plane indicated by the section line 2—2 of Figure 1 and shows further the specific details of the food slicer, a pressure member of the food slicer being shown in a final position by dotted lines, a guide on the food slicer being shown in an initial position by dotted lines;

Figure 3 is an end elevational view of the food slicer with portions thereof broken away and another portion shown in section for purposes of clarity, the drive for the movable knife being disconnected;

Figure 4 is a horizontal sectional view taken substantially upon the plane indicated by the section line 4—4 of Figure 2 and shows a specific connection between a feed nut supporting the pressure member and a feed screw, there also being illustrated the configuration of the movable knife;

Figure 5 is a fragmentary vertical sectional view taken substantially upon the plane indicated by the section line 5—5 of Figure 2 and shows the details of the drive for the movable knife, a connecting rod on the drive being shown in a lowered position by dotted lines;

Figure 6 is a fragmentary horizontal sectional view taken substantially on the plane indicated by the section line 6—6 of Figure 2 and shows the specific relationship between a drive gear and the feed screw;

Figure 7 is a fragmentary sectional view taken substantially upon the plane indicated by the section line 7—7 of Figure 2 and shows the specific details of the roller part of the food slicer including the details of a guideway for the movable knife;

Figure 8 is an elevational view of the drive gear of the food slicer and shows the arrangement of the various drive teeth thereof;

Figure 9 is a fragmentary sectional view taken substantially on the plane indicated by the section line 9—9 of Figure 2 and shows the details of adjusting nut carried by the drive shaft of the food slicer for selectively adjusting the drive train to disengage the movable knife; and Figure 10 is a perspective view of a shift member for shifting the driven gear with respect to the drive gear and retaining the driven gear in a shifted position.

Referring now to the drawings in detail, it will be seen that there is illustrated a food slicer and dicer which is the subject of this invention, the food slicer and dicer being referred to in general by the reference numeral 10. The food slicer and dicer 10 includes a supporting frame which is referred to in general by the reference numeral 12. The supporting frame 12 includes primarily a lower section, which is referred to in general by the reference numeral 14 and an upper section which is referred to in general by the reference numeral 16.

The lower section 14 is of an inverted U-shaped outline and includes a pair of depending legs 18 which are disposed in spaced parallel relation. The legs 18 have integrally connected to upper ends thereof upwardly and inwardly sloping portions 20 which terminate in an upper web 22.

The upper section 16 is generally rectangular in outline and is disposed generally normal to the lower section 14, the sections 14 and 16 being rotated ninety degrees with respect to each other. The upper section 16 includes a bottom wall 24, side walls 26 and 28, and a top wall 30. The bottom wall 24 is in overlying face-to-face relation with respect to the web 22 and is suitably secured thereto by fastening means such as welding or the like.

In order that the food slicer and dicer 10 may be easily handled, there is provided a suitable handle 32. The handle 32 seats upon the top wall 30 and is retained in place thereon by means of a fastener 34.

The legs 18 have extending therebetween a series of horizontally disposed knives 36. The knives 36 are disposed in parallel relation and are fixedly secured to the legs 18. The right edges of the knives 36, as viewed in Figure 2, are provided with sharpened edges. It is to be understood that the knives 36 also serve to brace the legs 18 against spreading.

As is best illustrated in Figures 2 and 7, each of the legs 18 is provided with a guideway 38 immediately adjacent the knives 36 and to the left thereof as viewed in Figure 2. Slidably disposed in the guideways 38 are ends of a movable knife 40 which extends between the legs 18. The movable knife 40 is provided with a lower cutting edge 42 and has secured to the left face thereof, as viewed in Figure 2, with a plurality of transversely spaced, vertically extending blades 44. The blades 44 have lower cutting edges 46. The knife 40 is reinforced intermediate the ends thereof by a transverse rib 48, as is best illustrated in Figure 2.

It will be readily apparent that when an article of food, such as the onion 50 illustrated in Figure 2, is moved through the knives 36 from right to left, as viewed in Figure 2, the article of food will be cut into a plurality of slices. In order to accomplish this, there is provided a pressure member which is referred to in general by the reference numeral 52. The pressure member 52 is generally of a U-shaped outline, as is best illustrated in Figure 1, and includes a pair of legs 54 connected together by a lower web 56. The lower web 56 has connected thereto a food engaging member 58 which is relatively wide, as is illustrated in Figure 2, as to exert the desired pressure upon the article of food to force it through the knives 36.

In order that the pressure member 52 may be properly supported and moved to force an article of food through the knives 36, there is provided a nut assembly which is referred to in general by the reference numeral 60. The nut assembly 60 includes a sleeve 62 which extends between the legs 18. The legs 54 are rotatably journaled on the sleeve 62 and spaced from the legs 18 by means of suitable spacer washers 64.

Disposed within the sleeve 62 are nut sections 66. The nut sections 66 have alignable openings 68 which are partially threaded for engagement with threads 70 on a feed screw 72. The feed screw 72 may also be considered as a driven shaft. The nut sections 66 are slidably disposed within the sleeve 62 and extend through vertical slots 73 formed in the legs 18. The nut sections 62 terminate in heads 74 which engage spring washers 76 carried by the nut sections 66 in engagement with the exterior surfaces of the legs 18.

It is to be noted that the spring washers 76 normally urge the nut sections 66 apart. This results in the holding of the threaded parts of the openings 68 in engagement with the threads 70. When it is desired to loose the nut sections 66 from the feed screw 72, it is merely necessary to push the ends of the nut sections 66 toward each other to compress the spring washers 76 thus disengaging the threaded portions on the openings 68 from the thread 70. The nut assembly 60 may then be moved vertically with respect to the feed screw 72 as desired.

Referring once again to Figure 2 in particular, it will be seen that intermediate parts of the legs 54 are provided with integral ears 78. Pivotally connected to the ears 78 by means of pivot pins 80 are support arms 82. The lower ends of the support arms 82 are pivotally connected to the legs 18 by pivot pins 84. It will be readily apparent from the foregoing description that the mounting of the pressure member 52 is such that when the nut assembly 60 is moved vertically relative to the legs 18 due to rotation of screw 72, the pressure member 52 will be simultaneously swung and slid to move from the solid line position of Figure 2, to the dotted line position of said figure, thus forcing the onion 50 through the knives 36.

Secured to the wall 28 and extending inwardly into the confines of the upper section 16 is a C-shaped mounting bracket which is referred to in general by the reference numeral 86. The mounting bracket 86 includes a vertical leg 88 disposed parallel to the wall 28, a lower leg 90 and an upper leg 92.

The feed screw 72 extends through the web 22 and the bottom wall 24 and is journaled therein. The feed screw 72 also has a reduced upper part 94 which is rotatably journaled in the lower leg 90. Downward movement of the feed screw 72 is prevented by means of a washer 96 which abuts against the upper surface of the lower wall 24. The upper part of the feed screw 72 is in the form of a square cross sectional portion 98.

Rotatably journaled in the wall 28 and the vertical leg 88 is a horizontal drive shaft 100 of a crank 102. The drive shaft 100 is also suitably journaled in a projecting boss 104 carried by the wall 26 and projecting outwardly therefrom. The drive shaft 100 is positioned relative to the supporting frame 12 by means of a collar 106 which engages the right hand surface of the vertical leg 88, as viewed in Figure 2, and a drive gear 108 which engages the left hand surface of the vertical leg 88. The crank 102 also includes an offset portion 110 and a handle portion 112 on which there is mounted a handle 114.

Referring now to Figure 8 in particular, it will be seen that a drive gear 108 includes a hub portion 116 and a pair of radiating portions 118 and 120 which are segmental in character. The radiating portion 120 is provided with series of teeth which include an innermost series 122, an outermost series 124 and intermediate series 126 and 128. The radiating portion 118 includes a series of teeth 130 which is disposed the same distance from the center of the drive gear 108 as is the teeth in the series 124. The teeth are in spaced concentric relation to the center of the gear 108.

Mounted on the square cross sectional portion 98 of the feed screw 72 for vertical sliding movement is a driven gear 132. In order that the driven gear 132 may be selectively positioned on the feed screw 72, there is provided a shift member which is referred to in general by the reference numeral 134.

Referring now to Figure 10 in particular, it will be seen that the shift member 134 includes a pair of vertical legs 136 which terminate at their upper ends in a horizontally disposed handle portion 138. The leg 136 terminate at their lower ends in inwardly directed leg 140 which in turn terminate in a loop 142. The lower portions of the legs 136 are of a wave-like form as at 144.

It is to be noted that the wall 28 is provided with a vertical slot 146. When the shift member 134 is properly mounted, the legs 136 are disposed on opposite sides of the mounting bracket 92 with the portions 144 thereof in interlocking engagement with opposite edge portions of the legs 90 and 92 of the mounting bracket 86 to retain the shift member 134 in a selected position. The loop portion 142 is engaged with the driven gear 132 to support it in a vertical position and at the same time permit rotation thereof relative to the shift member 134. By utilizing the handle 138 which projects through the opening 146, the shift member 134 together with the driven gear 132 may be selectively vertically positioned. By selectively vertically positioning the driven gear 132, it may be selectively aligned with the series of teeth carried by the drive gear 108 so as to vary the relative drive ratio between the drive shaft 100 and the feed screw 72.

Referring once again to Figure 2 in particular, it will be seen that the web 22 and the bottom wall 24 are provided with an elongated slot 148. Extending upwardly through the slot 148 is a connecting rod 150 whose lower end is pivotally connected to the upper part of the knife 40 by means of a pivot pin 152. The upper end of the connecting rod 150 is also provided with a pivot pin 154.

Journaled on the drive shaft 100 in spaced relation with respect to the drive gear 108 is a spacing arm 156. The pivot pin 154 pivotally connects the upper end of the connecting rod 150 to the upper end of the spacing arm 156. The upper part of the drive gear 108 is also provided with an opening 158 which has removably received therein a projecting part of the pivot pin 154 so as to connect the connecting rod 150 to the drive gear 108 in driving relation.

The left hand end of the drive shaft 100 is threaded as at 160, as viewed in Figure 2. Positioned on the threaded portion 160 is an adjusting nut 162. Also mounted on the drive shaft 100, but between the wall 26 and the spacing arm 156 is a spring washer 164. The spring washer 164 normally urges the spacing arm 156 and the connecting rod 150 to the right, as viewed in Figure 2, so that the pivot pin 154 is engaged in the opening 158. At this time, it is pointed out that the drive shaft 100 is formed in axial sections and that a left hand section 166 thereof extends from the spacing arm 156 to the left and that the main part of the drive shaft 100 terminates at the drive gear 108. Thus when the nut 162 is tightened down, to the position shown in Figure 3, the drive shaft section 166 will move to the left with the spring washer 164 being compressed. The spacing arm 156 will pull the upper part of the connecting rod 150 to the left, as viewed in Figure 2, to disengage the pivot pin 154 from the opening 158. Thus the drive shaft 100 at the main portion thereof is rotated to drive the drive gear 108 while the connecting rod 150 will remain stationary.

The food slicer and dicer 10 also includes a guard 170. The guard 170 is connected to the spacing washers 64 and includes legs 172 which are connected together by a transverse plate portion 174. The guard 170 is primarily intended to prevent juices, such as onion juice and the like from spraying over the adjoining edge during the slicing of such an article of food.

In the operation of the food slicer and dicer 10, the pressure member 51 is initially positioned in the solid line position as shown in Figure 2. The article of food to be sliced or diced, such as an onion 50 is positioned as illustrated. The pressure member 52 is then moved into contact with the article of food to be sliced by pushing inwardly on the ends of the nut sections 66 and moving the nut assembly 60 vertically on the feed screw 72 to the proper position. Then by turning the crank 102, the feed screw 72 is rotated so as to move the nut assembly 60 upon the feed screw 72 thus swinging the pressure member 50 downwardly and inwardly toward the knives 36. As the article of food is pushed through the knives, it will be cut into a plurality of horizontal slices, the slices engaging the guard 170 as they pass from between the knives 36 and moving into the left the desired distance.

By selectively positioning the driven gear 132 with respect to the series of teeth carried by the drive gear 108, the ratio of drive of the pressure member 152 may be varied in relation to the particular food being sliced. Thus when the driven gear 132 is engaged with the series 122, each rotation of the crank 102 will advance the article of food between the knives 36 only a slight distance. On the other hand, if the driven gear 132 is engaged with the teeth of the series 124, the pressure member 52 will be advanced a considerable distance. In general use, it is intended that the series 122, 126 and 128 be used for a dicing operation and that the series 124 together with the series 130 be used for providing slices only.

Inasmuch as the knife 40 is normally connected to the drive gear 108 for operation thereby, the knife 40 is reciprocated for each rotation of the crank 102. Therefore, small dice sections of the article of food passing through the knives 36 are formed. In the event the blades 46 are omitted from the knife 40, an elongated strip will be formed.

When it is desired to cut the article of food into slices only, a pivot pin 154 is disengaged from the drive gear 108, as is best illustrated in Figure 3, and the crank 102 is operated in the normal manner. This results in the movement of the pressure member 52 only so that the article of food is passed through the knives 36 without being cut off. In order to increase the speed of the operation, the driven gear 132 should be engaged with the series 124 and 130.

The foregoing is considered to be illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed is:

1. A food slicer comprising a supporting frame, a fixed series of knives carried by said supporting frame for simultaneously slicing an article of food, a pressure member for engaging an article of food to move the same through said knives, mounting means pivotally mounting said pressure member on said supporting frame, and feed means carried by said supporting frame and connected to said pressure member for moving said pressure member relative to said knives, said feed means including a vertical feed screw, said mounting means including displaceable nut sections mounted on said feed screw, and a support arm having one end pivotally connected to said supporting frame and an opposite end pivotally connected to said pressure member whereby combined vertical sliding and swinging movement of said pressure member is effected.

2. A food slicer comprising a supporting frame, a fixed series of knives carried by said supporting frame for simultaneously slicing an article of food, a pressure member for engaging an article of food to move the same through said knives, mounting means pivotally mounting said pressure member on said supporting frame, and feed means carried by said supporting frame and connected to said pressure member for moving said pressure member relative to said knives, said feed means including a variable speed drive, said variable speed drive including a driven shaft, a driven gear on said driven shaft, a drive shaft, a drive gear on said drive shaft, said drive gear having a plurality of series of drive teeth, means mounting said driven gear on said driven shaft for movement relative to said drive gear whereby different ones of said drive teeth may be selectively meshed with said driven gear.

3. A food slicer comprising a supporting frame, a fixed series of knives carried by said supporting frame for simultaneously slicing an article of food, a pressure member for engaging an article of food to move the same through said knives, mounting means pivotally mounting said pressure member on said supporting frame, and feed means carried by said supporting frame and connected to said pressure member for moving said pressure member relative to said knives, said feed means including a feed screw, said mounting means including a nut mounted on said feed screw, and a variable speed drive connected to said feed screw, said variable speed drive including said feed screw, a driven gear on said feed screw, a drive shaft, a drive gear on said drive shaft, said drive gear having a plurality of series of drive teeth, means mounting said driven gear on said feed screw for movement relative to said drive gear whereby different ones of said drive teeth may be selectively meshed with said driven gear.

4. A food slicer comprising a supporting frame, a fixed series of knives carried by said supporting frame for simultaneously slicing an article of food, a pressure member for engaging an article of food to move the same through said knives, mounting means pivotally mounting said pressure member on said supporting frame, and feed means carried by said supporting frame and connected to said pressure member for moving said pressure member relative to said knives, said feed means including a feed screw, and a variable speed drive connected to said feed screw, said mounting means including a nut mounted on said feed screw, and a support arm having one end pivotally connected to said supporting frame and an opposite end pivotally connected to said pressure member whereby combined sliding and swinging movement of said pressure member is effected.

5. A food slicer comprising a supporting frame, a fixed series of knives carried by said supporting frame for simultaneously slicing an article of food, a pressure member for engaging an article of food to move the same through said knives, mounting means pivotally mounting said pressure member on said supporting frame, and feed means carried by said supporting frame and connected to said pressure member for moving said pressure member relative to said knives, said feed means including a feed screw, and a variable speed drive connected to said feed screw, said mounting means including a nut mounted on said feed screw, and a support arm having one end pivotally connected to said supporting frame and an opposite end pivotally connected to said pressure member whereby combined sliding and swinging movement of said pressure member is effected, said variable speed drive including said feed screw, a driven gear on said feed screw, a drive shaft, a drive gear on said drive shaft, said drive gear having a plurality of series of drive teeth, means mounting said driven gear on said feed screw for movement relative to said drive gear whereby different ones of said drive teeth may be selectively meshed with said driven gear.

6. A food slicer comprising a supporting frame, a fixed series of knives carried by said supporting frame for simultaneously slicing an article of food, a pressure member for engaging an article of food to move the same through said knives, mounting means pivotally mounting said pressure member on said supporting frame, and feed means carried by said supporting frame and connected to said pressure member for moving said pressure member relative to said knives, said feed means including a feed screw, said mounting means including a nut mounted on said feed screw, and a variable speed drive connected to said feed screw, a movable knife carried by said supporting frame movable transverse to said fixed knives, said feed means including means simultaneously reciprocating said movable knife and urging said pressure member toward said fixed series of knives and said movable knife.

7. A food slicer comprising a supporting frame, a fixed series of knives carried by said supporting frame for simultaneously slicing an article of food, a pressure member for engaging an article of food to move the same through said knives, mounting means pivotally mounting said pressure member on said supporting frame, and feed means carried by said supporting frame and connected to said pressure member for moving said pressure member relative to said knives, said feed means including a driven shaft, a driven gear on said driven shaft, a drive shaft, a drive gear on said drive shaft, said drive gear having a plurality of series of drive teeth, means mounting said driven gear on said driven shaft for movement relative to said drive gear whereby different ones of said drive teeth may be selectively meshed with said driven gear, and a movable knife carried by said supporting frame for movement transversely of said fixed knives, means connecting said movable knife to said drive gear for reciprocating said movable knife simultaneously with the operation of said feed screw.

References Cited in the file of this patent

UNITED STATES PATENTS

| 1,709,912 | Johnston | Apr. 23, 1929 |
| 2,341,582 | Turner | Feb. 15, 1944 |
| 2,538,906 | Ives | Jan. 23, 1951 |

FOREIGN PATENTS

| 82,142 | Norway | July 27, 1953 |